US006675957B2

(12) United States Patent
Greive et al.

(10) Patent No.: US 6,675,957 B2
(45) Date of Patent: Jan. 13, 2004

(54) DEVICE FOR CONVEYING PRINTED PRODUCTS THROUGH A PRINTING-RELATED MACHINE

(75) Inventors: Martin Greive, Schönau (DE); Clemens Rensch, Heidelberg (DE); Andreas Rupprecht, Mauer (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 21 days.

(21) Appl. No.: 10/002,926

(22) Filed: Nov. 2, 2001

(65) Prior Publication Data

US 2002/0092735 A1 Jul. 18, 2002

(30) Foreign Application Priority Data

Nov. 3, 2000 (DE) ........................................ 100 54 451

(51) Int. Cl.[7] ................................................ B65G 23/04
(52) U.S. Cl. ........................................................ 198/835
(58) Field of Search ............................... 198/832.1, 835

(56) References Cited

U.S. PATENT DOCUMENTS 2,583,471 A * 1/1952 Collis ......................... 198/835
3,291,287 A * 12/1966 Rehm ...................... 198/835 X
5,121,170 A 6/1992 Bannai et al. .......... 198/671 X
5,452,791 A * 9/1995 Morency et al. ............ 198/835
5,871,085 A * 2/1999 Yagi ........................... 198/835
6,189,684 B1 2/2001 Greive ....................... 198/835

FOREIGN PATENT DOCUMENTS

| | | | | |
|---|---|---|---|---|
| DE | 40 15 210 C2 | | 11/1990 | |
| DE | 195 38 632 A1 | | 4/1997 | |
| DE | 198 56 372 A1 | | 7/1999 | |
| GB | 552074 | * | 3/1943 | ................. 198/835 |
| SU | 198208 | * | 8/1967 | ................. 198/835 |

* cited by examiner

*Primary Examiner*—James R. Bidwell
(74) *Attorney, Agent, or Firm*—Laurence A. Greenberg; Werner H. Stemer; Ralph E. Locher

(57) ABSTRACT

A device for conveying printed products through a printing-related machine includes at least one endless conveyor belt running over deflecting rollers and having at least one printed product resting thereon during a conveying operation, and a rotating frictional element provided for driving the conveyor belt, the frictional element being in contact with the conveyor belt on a side thereof whereon the printed product is transported.

5 Claims, 5 Drawing Sheets

DEVICE FOR CONVEYING PRINTED PRODUCTS THROUGH A PRINTING-RELATED MACHINE

BACKGROUND OF THE INVENTION

Field of the Invention

The invention relates to a device for conveying printed products through a printing-related machine.

It has become known heretofore to use conveyor belts in order to convey sheets through electrographic printing machines. The published German Patent Document DE 40 152 10 A1 discloses a device for transporting sheet materials, wherein the sheets are retained on the surface of a conveyor belt by electrostatic retaining forces. The conveyor belt is positioned over deflecting or idler rollers. One of the deflecting rollers is driven and causes the belt to be advanced by frictional contact on the side thereof directed away from the sheet. Located along the conveying distance are printing devices which successively apply individual colors of a multicolored printed image to a sheet. The length and width of the conveyor belt are adapted to the dimensions of the printing device. In order to produce a five-color printing image, five printing units are arranged in tandem or behind one another in series along the conveyor belt. Printing machines with a great overall length are produced thereby. When printing with one or two colors takes place on such a printing machine, a series of printing units remains unused, while the sheets always run through the entire conveying distance for five-color printing. A conveyor belt which runs over five printing units undergoes considerable stretching, which impedes control and regulation of the sheet transportation.

SUMMARY OF THE INVENTION

It is accordingly an object of the invention to provide a device for conveying printed products through a printing-related machine which allows high flexibility when processing print jobs.

With the foregoing and other objects in view, there is provided, in accordance with the invention, a device for conveying printed products through a printing-related machine, comprising at least one endless conveyor belt running over deflecting rollers and having at least one printed product resting thereon during a conveying operation, and a rotating frictional element provided for driving the conveying belt, the frictional element being in contact with the conveyor belt on a side thereof whereon the printed product is transported.

In accordance with another feature of the invention, the conveyor belt is looped about the frictional element at an angle smaller than 180°.

In accordance with a further feature of the invention, the frictional element is disposed in a vertically running section of the conveyor belt.

In accordance with an added feature of the invention, the conveying device includes another conveyor belt adjacent to the first-mentioned conveyor belt and, for driving both of the mutually adjacent conveyor belts simultaneously, the frictional element is engageable with both of the conveyor belts on the side thereof, respectively, whereon the printed product is transported.

In accordance with an additional feature of the invention, the conveying device includes another conveyor belt, and wherein, for conveying printed products at least approximately horizontally, the conveyor belts are arranged behind one another, the frictional element being provided in a section thereof wherein the conveyor belts, respectively, in relation to a vertical plane of symmetry, are looped about a sub-section of the frictional element and run over deflecting rollers.

In accordance with yet another feature of the invention, the frictional element is a cylindrical drive roller.

In accordance with yet a further feature of the invention, the printing-related machine is a printing machine with a plurality of printing modules arranged in accordance with a unit construction principle, a respective conveyor belt and a respective frictional element being assigned to each of the printing modules, at least one of the frictional elements being driven.

In accordance with a concomitant feature of the invention, the conveying device includes a convexly curved guide over which the conveyor belt runs in a conveying path for printed products.

By providing a rotating frictional element on that side of a conveyor belt whereon the printed products are transported makes it possible, in particular, for printing machines to be assembled from individual modules, the outlay for driving the conveyor belts of the modules being low. The belt lengths in a module are determinable quite well by suitable control technology. When a plurality of modules are provided in series or tandem, a printed product is transferred from module to module. Appropriate transport of the printed product can he controlled and regulated separately for each module.

Other features which are considered as characteristic for the invention are set forth in the appended claims.

Although the invention is illustrated and described herein as embodied in a device for conveying printed products through a printing-related machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
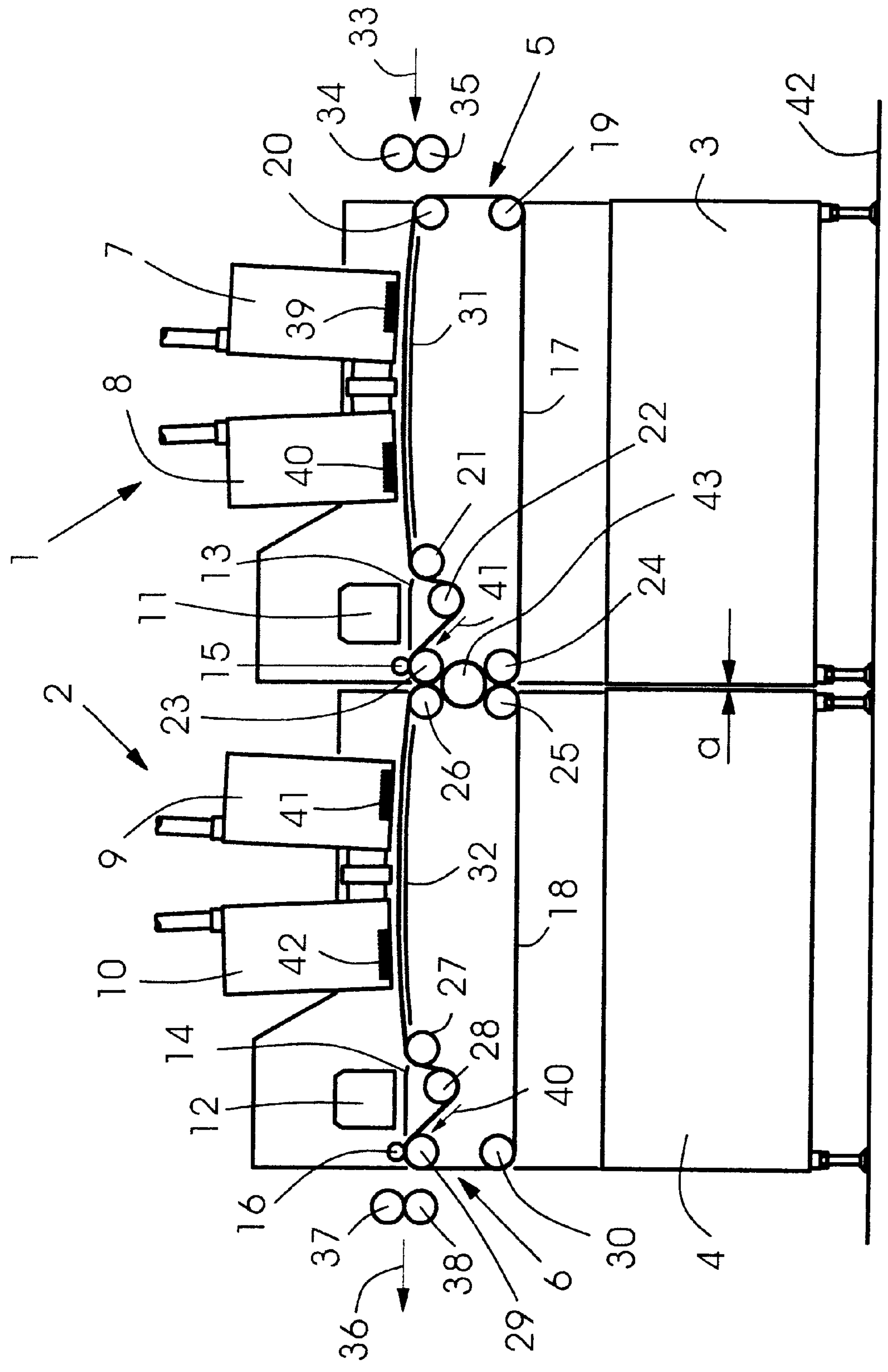
FIGS. 1 to 3 are diagrammatic side elevational views of different embodiments of two-color printing machines, each having two printing modules.

Referring now to the drawings and, first, particularly to FIG. 1 thereof, there is illustrated therein a two-color printing machine with two printing modules 1 and 2, arranged in tandem or behind one another in series, for printing sheets. The printing modules 1 and 2 are of identical construction. Each printing module 1 and 2 has a height-adjustable framework 3, 4, a belt conveying system 5, 6, in each case two ink-jet printing heads 7, 8; 9, 10, a heat fixing arrangement 11, 12, sheet-guiding elements 13, 14 and sheet-transporting rollers 15, 16. The belt conveying systems 5, 6, respectively, include a conveyor belt 17, 18, a series of deflecting rollers 19 to 30 and belt-guiding elements 31, 32. The belt conveying systems 5, 6 allow sheets to be transported in a planar and horizontal manner. Sheets are fed from a sheet pile to the printing module 1 in the direction of the arrow 33 by friction rollers 34 and 35. Printed sheets are transported from the printing module 2 to a sheet pile in the direction of the arrow 36 with the aid of friction rollers 37 and 38. The belt-guiding elements 31, 32 cause the conveying belts 17, 18 to run in a slightly convexly curved manner in the sheet-transporting path. The sheets are retained on the surface of the conveyor belts 17, 18 by electrostatic forces or with the aid of blowing-air or suction-air arrangements. The sheets assume the curved shape of the conveyor belts 17, 18, as a result of which the sheets rest in a planar manner on the conveyor belts 17, 18 during transportation. Turned-over corners or appended edges of the sheets do not occur in practice. In accordance with the curvature of the conveyor belts 17, 18, the ink-jet printing heads 7 to 10 are arranged slightly inclined relative to the vertical. Nozzle systems 39, 40, 41, 42 in the ink-jet printing heads 7 to 10 spray ink droplets at least approximately vertically onto the surface of the sheets located on the conveyor belts 17, 18. The ink-jet printing heads 7 to 10 are distributed over the format width and are arranged transversely to the running direction of the conveyor belts 17, 18. A special feature of the belt and sheet guidance exists in the region of a heat fixing device 11, 12 for freshly applied ink droplets. Via the deflecting rollers 21, 22, 23 and 27, 28, 29, the conveyor belts 17, 18 are guided past the heat fixing devices 11, 12 and beneath the latter and the sheet-guiding elements 13, 14. The sheet-guiding elements 13, 14 serve not only for sheet guidance but also as a heat protection shield. The heat fixing devices 11, 12 consequently have no adverse effect on the conveyor belts 17, 18. The deflecting rollers 21, 28 acting on the sheet-transporting side may be tilted transversely to the running direction 40, 41 for lateral control of the conveyor belts 17, 18.

The printing modules 1, 2 are positioned a slight distance away from one another and are fixed to the base 42, so that sheets are transferred in-register from the printing module 1 to the printing module 2. In order to drive the conveying belts 17, 18 simultaneously, a frictional roller 43, which is coupled to a motor, is provided. The frictional roller 43 is arranged symmetrically between the deflecting rollers 23 to 26. The lengths of the conveyor belts 17, 18 by which the conveyor belts 17, 18 are looped around the frictional roller 43 are exactly the same so that the conveyor belts 17, 18 run synchronously. The conveyor belts 17, 18 are provided with a frictional coating on the sheet-transporting side thereof, which results in the provision of a particularly high coefficient of friction with respect to the frictional roller 43.

In the exemplary embodiments according to FIGS. 2 to 5, the elements of the printing modules 44 to 55 and the frictional rollers 34, 35, 37, 38 fulfill the same functions as have been described for the printing modules 1, 2 according to FIG. 1.

Figure 2:
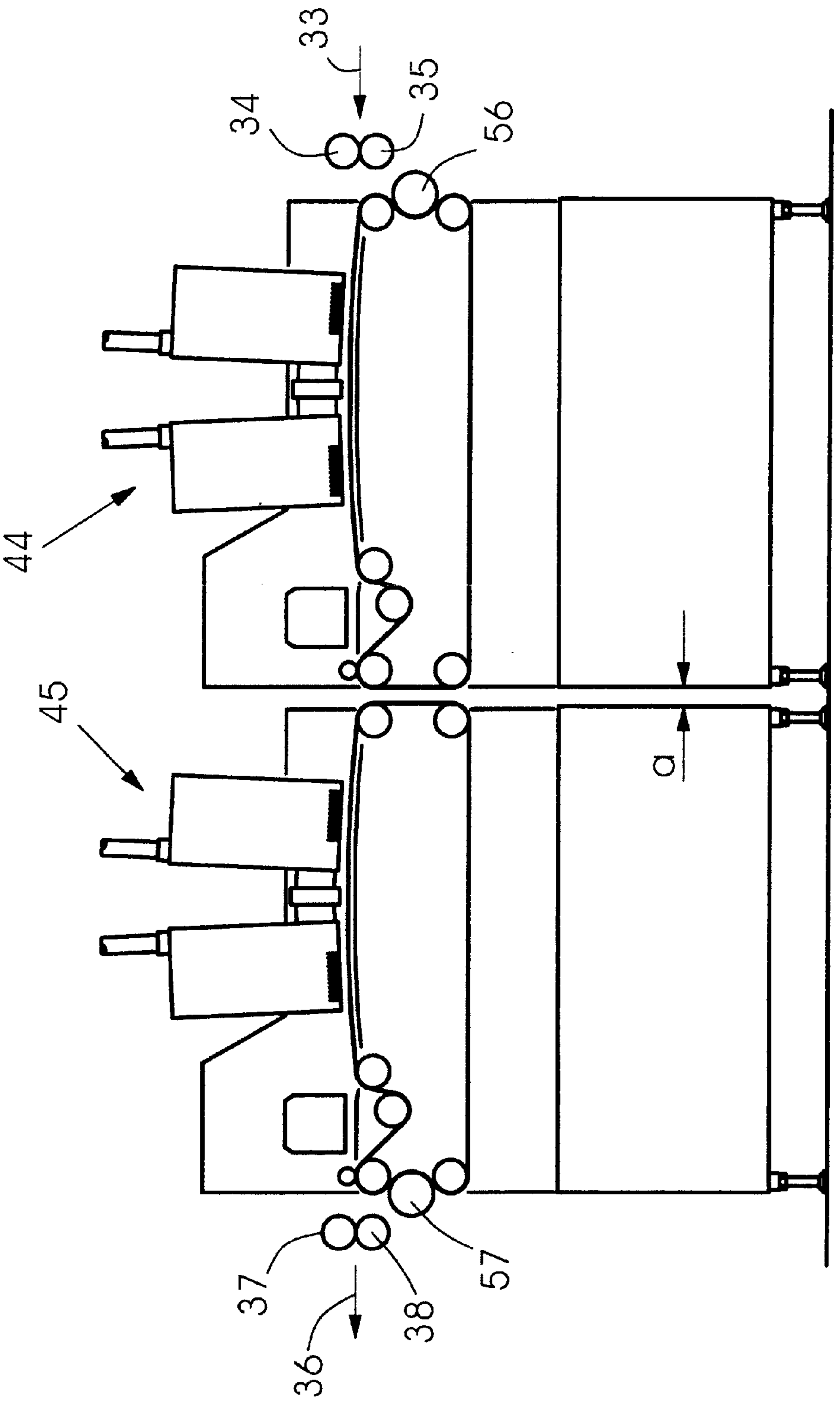

FIG. 2 likewise shows a two-color printing machine with printing modules 44, 45. In contrast with FIG. 1, each printing module 44, 45 has assigned thereto separate frictional rollers 56, 57, each of which is coupled to a motor. The frictional rollers 56, 57, which act upon the sheet-transporting side, are located between the deflecting rollers, and are arranged vertically above one another, respectively, on the sheet-input side and the sheet-discharge side. The angle at which the conveyor belts 17, 18 are looped or wrapped around the frictional rollers 56, 57 and the belt lengths correspond to those in the embodiment according to FIG. 1. The synchronicity of the transporting speeds of the conveyor belts is ensured by a common motor-control circuit or mechanically by a gear transmission or flexible drive mechanism. The distance a between the printing modules 44 and 45 may be selected to be greater than has been described with respect to FIG. 1.

Figure 3:
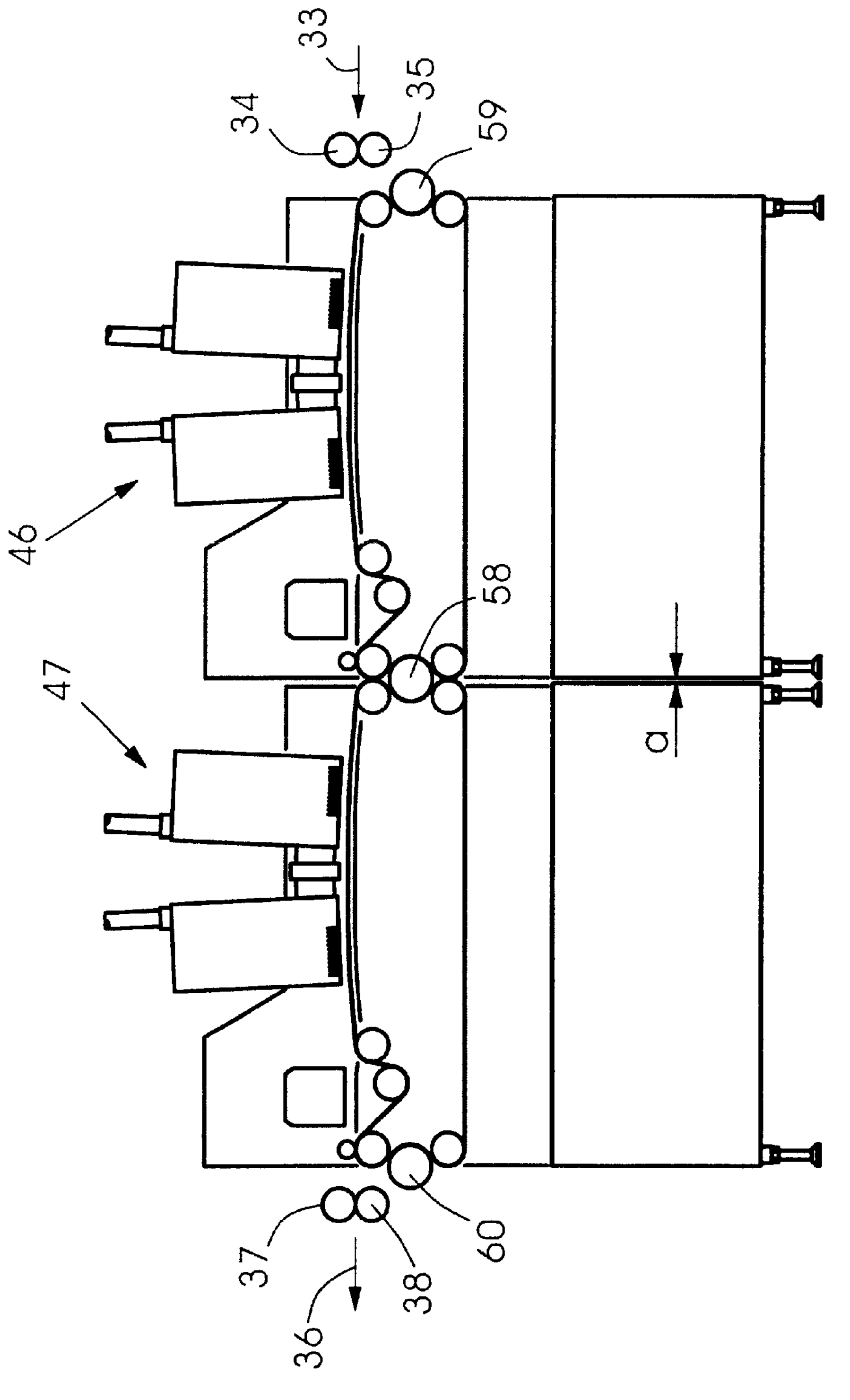

The identical printing modules 46 and 47 of a two-color printing machine, which are shown in FIG. 3, include, for the purpose of driving the conveyor belts simultaneously, as has been described with regard to FIG. 1, a common frictional roller 58, which is driven by a motor. In addition, the printing modules 46 and 47 include respective deflecting rollers 59 and 60 on the sheet infeed side and the sheet discharge side, respectively, the rollers 59 and 60, like the frictional rollers 56 and 57 in FIG. 2, running along therewith on the sheet-transporting side of the conveyor belts. Due to the running of the deflecting rollers 59 and 60 along therewith, the lengths of the conveyor belts of the printing modules 44 and 45 in FIG. 3 are configured to be somewhat greater than the lengths of the conveyor belts of the printing modules 1, 2, 44, 45 shown in FIGS. 1 and 2.

Figure 4:
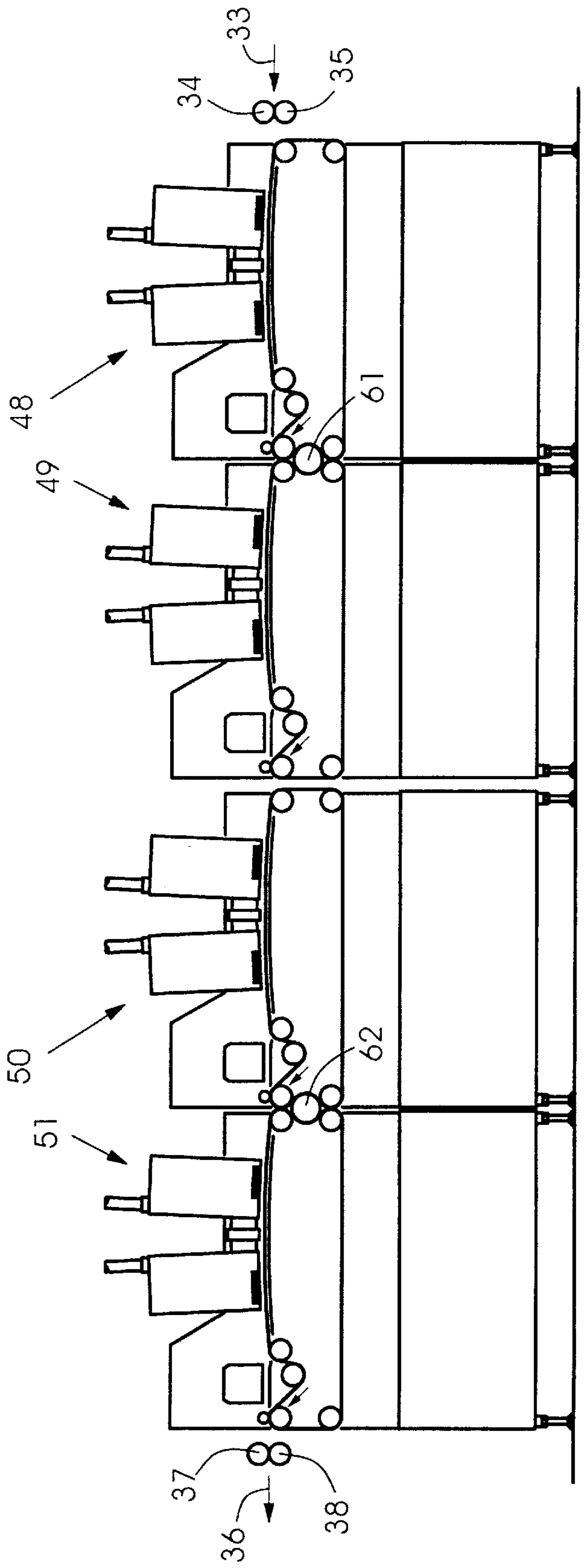
FIGS. 4 and 5 are diagrammatic side elevational views of different embodiments of four-color printing machines, each having four printing modules.

FIG. 4 illustrates a four-color printing machine with four printing modules 48 to 51. This four-color printing machine may be produced by assembling together two of the two-color printing machines according to FIG. 1. Synchronous running of the conveyor belts within the printing modules 48, 49 and 50, 51, arranged in groups of two, is achieved by jointly driving with the frictional rollers 61 and 62. Synchronous running of the driven frictional rollers 61 and 62 may be ensured by a common motor control or a mechanical gear transmission.

Figure 5:
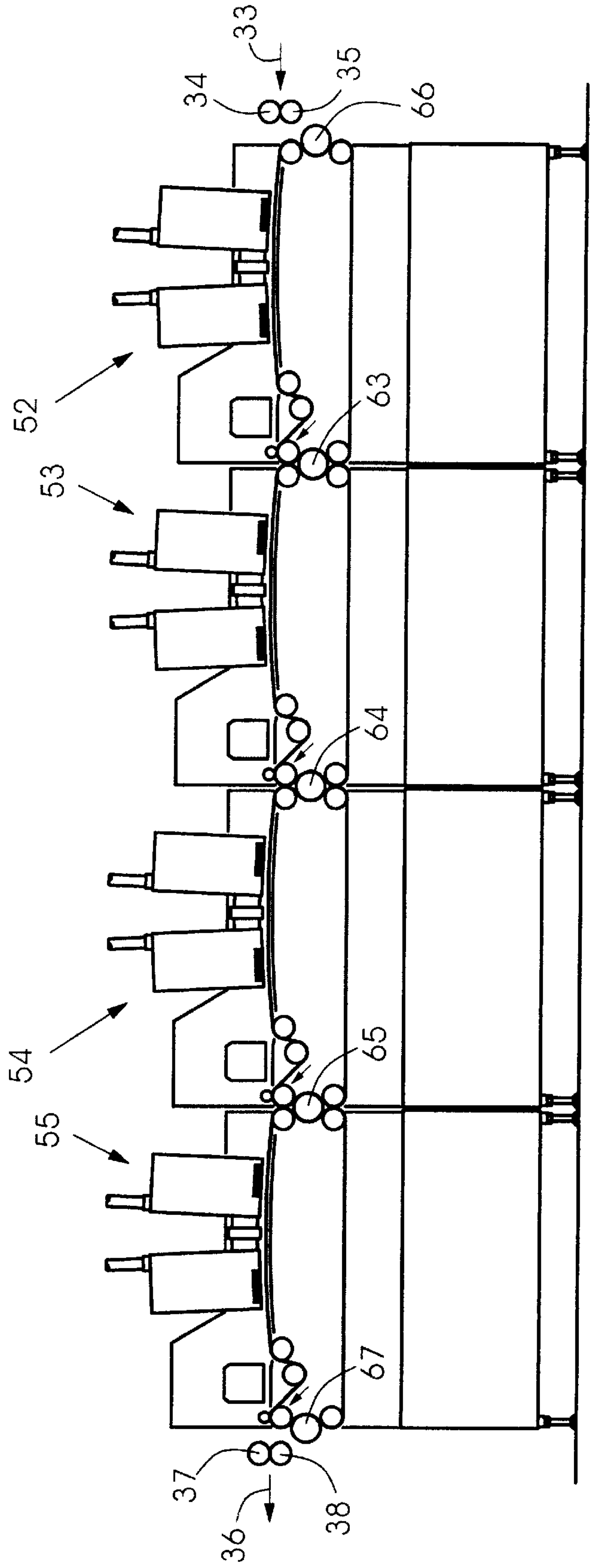

In the four-color printing machine shown in FIG. 5, four printing modules 52 to 55 are arranged in series or tandem. With respect to the belt lengths and the distances between the printing modules 52 and 55, that which has been stated hereinabove with regard to FIG. 3, applies as well to FIG. 5. A driven frictional roller 63 to 66, respectively, is provided between respective pairs of the printing modules 52 to 55. The deflecting roller 67 on the sheet-discharge side runs along merely with a friction lock on the sheet-transporting side of the conveyor belts of the printing module 55. The motors for driving the frictional rollers 63 to 66, respectively, feed a given amount of power into the system as a whole. The tensioning conditions in the individual belts can thus be influenced specifically and independently of one another, as a result of which the individual colors may be printed in register over one another.

The invention of the instant application has been described by way of example with reference to ink-jet printing machines, but is not intended to be limited thereto. The arrangement for conveying printed products, such as sheets, folded copies and finished products, may likewise be provided in a machine which inspects the printed products.

We claim:

1. A device for conveying printed products through a printing-related machine, comprising at least one endless conveyor belt running over deflecting rollers and having at least one printed product resting thereon during a conveying operation, a further conveyor belt adjacent said conveyor belt, said conveyor belt and said further conveyor belt disposed in tandem or behind one another in series, and a rotating frictional element being disposed in a vertically running section of said conveyor belts and in a section having said conveyor belts, in relation to a vertical plane of symmetry, looped about a sub-section of said frictional element and running over the deflecting rollers, said rotational frictional element driving said conveying belts, and said frictional element being in contact with said conveyor belts on a side thereof transporting the printed product.

2. The conveying device according to claim 1, wherein said conveyor belt is looped about said frictional element at an angle smaller than 180°.

3. The conveying device according to claim 1, wherein said frictional element is a cylindrical drive roller.

4. The conveying device according to claim 1, wherein the printing-related machine is a printing machine with a plurality of printing modules arranged in accordance with a unit construction principle, a respective conveyor belt and a respective frictional element being assigned to each of said printing modules, at least one of said frictional elements being driven.

5. The conveying device according to claim 1, including a convexly curved guide over which said conveyor belt runs in a conveying path for printed products.

* * * * *